United States Patent [19]
Bell et al.

[11] Patent Number: 5,223,827
[45] Date of Patent: Jun. 29, 1993

[54] PROCESS AND APPARATUS FOR MANAGING NETWORK EVENT COUNTERS

[75] Inventors: Rodney A. Bell, Littleton; Edward G. Britton, Chapel Hill, both of N.C.

[73] Assignee: International Business Machines Corporation, Armonk, N.Y.

[21] Appl. No.: 704,539

[22] Filed: May 23, 1991

[51] Int. Cl.⁵ .............................................. G05B 23/02
[52] U.S. Cl. ................... 340/825.06; 371/5.1
[58] Field of Search .................. 340/825.65, 825.06, 340/825.15; 371/5.1; 377/28, 51

[56] References Cited

U.S. PATENT DOCUMENTS

| | | | |
|---|---|---|---|
| 3,681,578 | 8/1972 | Stevens | 371/5.1 |
| 3,906,454 | 9/1975 | Martin | 395/775 |
| 4,080,589 | 3/1978 | Kline | 371/5.1 |
| 4,241,445 | 12/1980 | Payen | 371/5.1 |
| 4,291,403 | 9/1981 | Wadill et al. | 371/5.1 |
| 4,339,657 | 7/1982 | Larson et al. | 371/5.1 |
| 4,363,123 | 12/1982 | Grover | 371/5.3 |
| 4,800,562 | 1/1989 | Hicks | 371/5.1 |

Primary Examiner—Donald J. Yubko
Assistant Examiner—Michael Horabik
Attorney, Agent, or Firm—Jerry W. Herndon

[57] ABSTRACT

A process and apparatus for detecting the occurrence of an event threshold and performing some type of action in response to the detection. The disclosed use of the invention is for managing communication connections in a network. An event counter, a sliding event threshold counter and a sliding interval counter are initialized to prescribed initial states at the start of counter management. At the expiration of an interval specified by the contents of the sliding interval counter, the sliding interval counter is incremented by an offset time value, and the sliding event threshold counter is updated by the sum of an offset event value and the event counter. The event counter is incremented on each occurrence of an event to be counted. Each time the event counter exceeds a threshold established by the sliding threshold event counter, the sliding threshold event counter is incremented by the contents of the offset event value, and the sliding interval counter is updated to the sum of the offset time value and the present time. Thus, all values of interest are maintained by a combination of keeping an absolute count of the events, and by "sliding" the contents of two counters, one of which is used to measure successive time intervals and the other to set a new threshold for each successive interval based on the offset threshold and the absolute event count at the beginning of the interval.

22 Claims, 3 Drawing Sheets

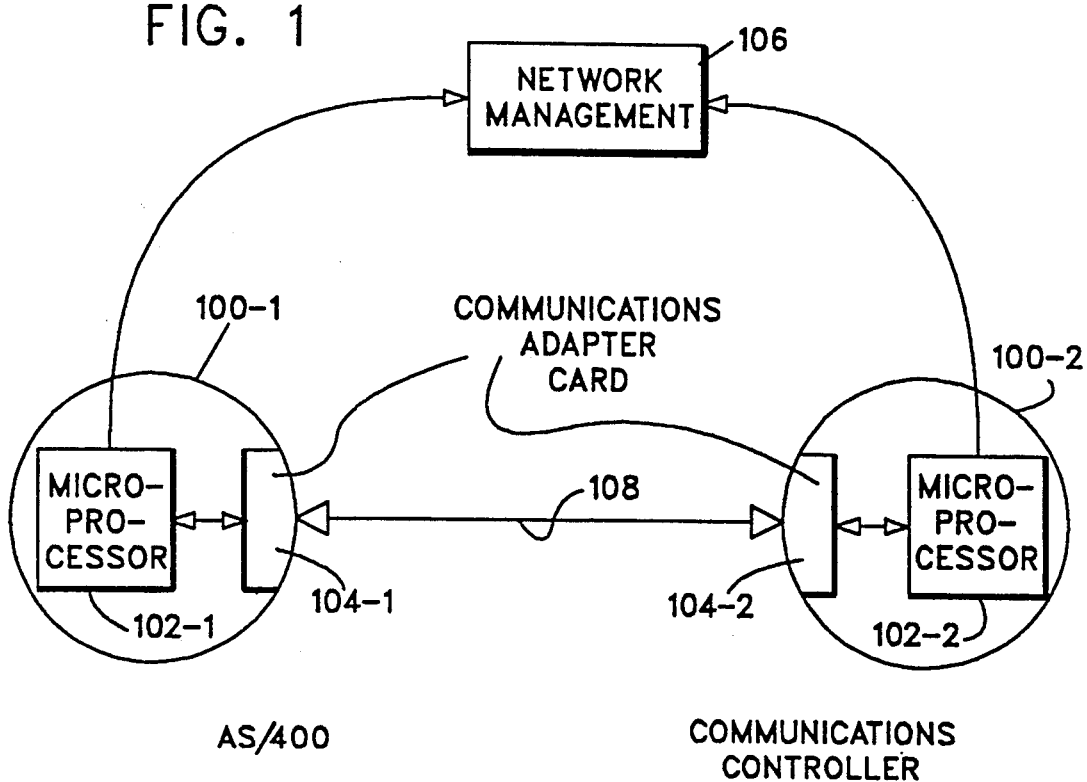
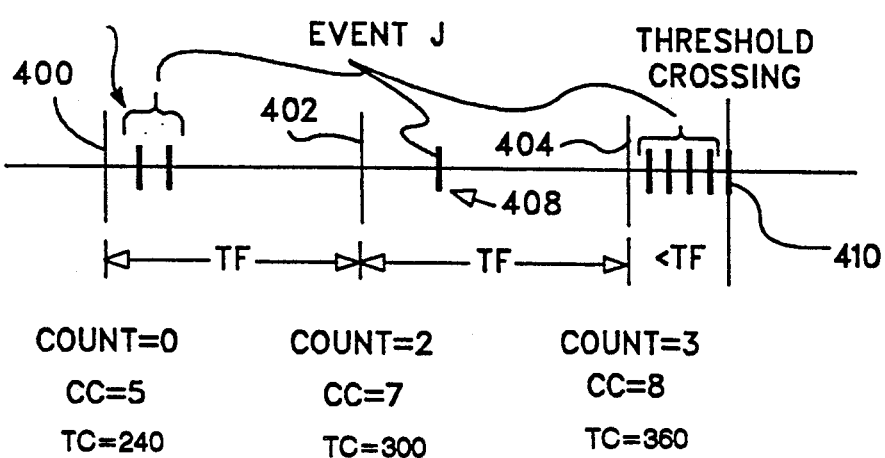

PROCESS AND APPARATUS FOR MANAGING NETWORK EVENT COUNTERS

TECHNICAL FIELD

The invention relates generally to event counting. In particular, it relates to the accumulation of event information, such as network errors or usage information, for managing networks and in a way that conforms to certain standard network specifications, such as set forth by the OSI standards.

BACKGROUND OF THE INVENTION

Network management applications often need to know, for a given type of event on a given connection, a variety of network performance items including the total number of events that occur during the connection, the number of times that the event occurrences reach some threshold value (threshold crossing), how often this is occurring, and other information. The invention has the ability to perform these and other functions in a novel manner that conforms with OSI standards.

Event counting is well known in various arts. For example, in the telephone switching art, it has been a common practice for many years to accumulate "peg" counts of the utilization of switching office resources as well as the number of trouble reports reported by the resources. Such peg counts are typically used to estimate the adequacy of the resources for handling call loads, especially during busy hour traffic. Event counting is also known in the computing art. U.S. Pat. No. 3,906,454 describes a computer monitoring system for detecting, filtering and storing both hardware and software events. The system is geared toward a debugging system, whereby system information can be gathered without interrupting the operation of the computer system, thereby avoiding a source of system distortion that can render test results less useful. Event and error counting is also common in the networking art, for example to assess the level of transmission quality of the various network connections between nodes and users. Typical known techniques for networks include accumulation of total error counts during a connection and the measuring of the duration of the connection; counting until a threshold is reached, irrespective of how long it takes to reach the threshold and counting to a threshold, thereafter followed by variations on the thresholds and timing intervals intended to discover bursty, but transient conditions, and actual degraded connections that should be retired.

In U.S. Pat. No. 4,080,589, the occurrence of an error triggers a timer and begins a counting interval. Subsequent errors occurring during the interval are counted until a predetermined threshold is reached or the timing interval expires. If the threshold is reached before expiration of the interval, an alarm is signaled and the timer is reset to begin a new interval. Each subsequent error resets the timer until a complete error free interval occurs.

In U.S. Pat. No. 4,241,445, a time base circuit measures recurrent intervals T2; each T2 contains an intermediate interval T1. A first error counter counts errors up to a threshold during intervals equal at most to T2 and at a minimum to T1. A second error counter counts each threshold crossing of the first counter. The second counter signals an alarm when it reaches a predetermined value.

In U.S. Pat. No. 4,291,403, if an error count exceeds a predetermined threshold during an established time period, an alarm is generated and a second threshold is established to measure subsequent error rates.

U.S. Pat. No. 4,339,657 establishes a variable time interval measured by a predetermined number of operations that occur. The arrangement counts errors occurring during the operations and also counts the number of times that the error count crosses a predetermined threshold.

U.S. Pat. No. 4,800,562 is said to provide a continuous indication of data quality in a data stream. A first counter counts periodic events in a data stream. A second counter counts errors in the data stream. When the first counter overflows, it recycles and also resets the second counter. When the second counter overflows, it recycles and resets the first counter. If the error rate is low in relation to the periodic events, the first counter will prevent the second counter from overflowing. An overflow of the second counter indicates an excessive error condition.

Other background art is described in U.S. Pat. Nos. 4,363,123 and 4,291,403.

While the known art is satisfactory in specific instances, the art does not provide sufficient flexibility for today's standards. Techniques are needed that enable the accumulation of information that can be manipulated to provide a variety of measurements, while at the same time being efficient and simple to implement.

SUMMARY OF THE INVENTION

The invention is a method and apparatus for detecting the occurrence of an event threshold and performing some type of action in response to the detection. Successive intervals of time are measured in any desired way. An indication is maintained of the total number of events that have occurred from the start of event monitoring. An event threshold comparison value is established at the beginning of each interval. The established value is made relative to the total number of events that have occurred up to that point. In response to a prescribed stimulus, a comparison is made between the indication of the total number of events that have occurred to the event comparison threshold value to determine if the threshold has been reached during the present interval. The stimulus may be the occurrence of an event, the expiration of an interval, or other desired stimulus.

In a preferred embodiment, an event counter, a sliding event threshold counter and a sliding interval counter are initialized to prescribed initial states at the start of counter management. At the expiration of an interval specified by the contents of the sliding interval counter, the sliding interval counter is incremented by an offset time value, and the sliding event threshold counter is updated by the sum of an offset event value and the event counter. The event counter is incremented on each occurrence of an event to be counted. Each time the event counter exceeds a threshold established by the sliding threshold event counter, the sliding threshold event counter is incremented by the contents of the offset event value, and the sliding interval counter is updated to the sum of the offset time value and the present time. Thus, all values of interest are maintained by a combination of keeping an absolute count of the events, and by "sliding" the contents of two counters, one of which is used to measure successive time intervals and the other to set a new event threshold for each successive interval based on the offset and the absolute event count at the beginning of the interval.

One application of the invention is in a communications network to manage the communication connections between the network nodes and especially to detect degradation of a connection. Relevant information for managing the network is provided by each node periodically to a network management application program in the preferred embodiment.

DESCRIPTION OF THE DRAWING

In the drawing,

FIG. 1 sets one illustrative environment for use of the invention. A simplified, illustrative network consists of two nodes and a network management system located somewhere in the network. Communication adapter cards at each node contain apparatus and/or software for accumulating event information on connections to which they are attached and communicating this information via their nodes to the network manager;

FIG. 4 shows, as an aid to understanding, one example of the occurrence of errors of a given type and the resulting effect of the errors on the sliding counters.

DETAILED DESCRIPTION

Figure 2:
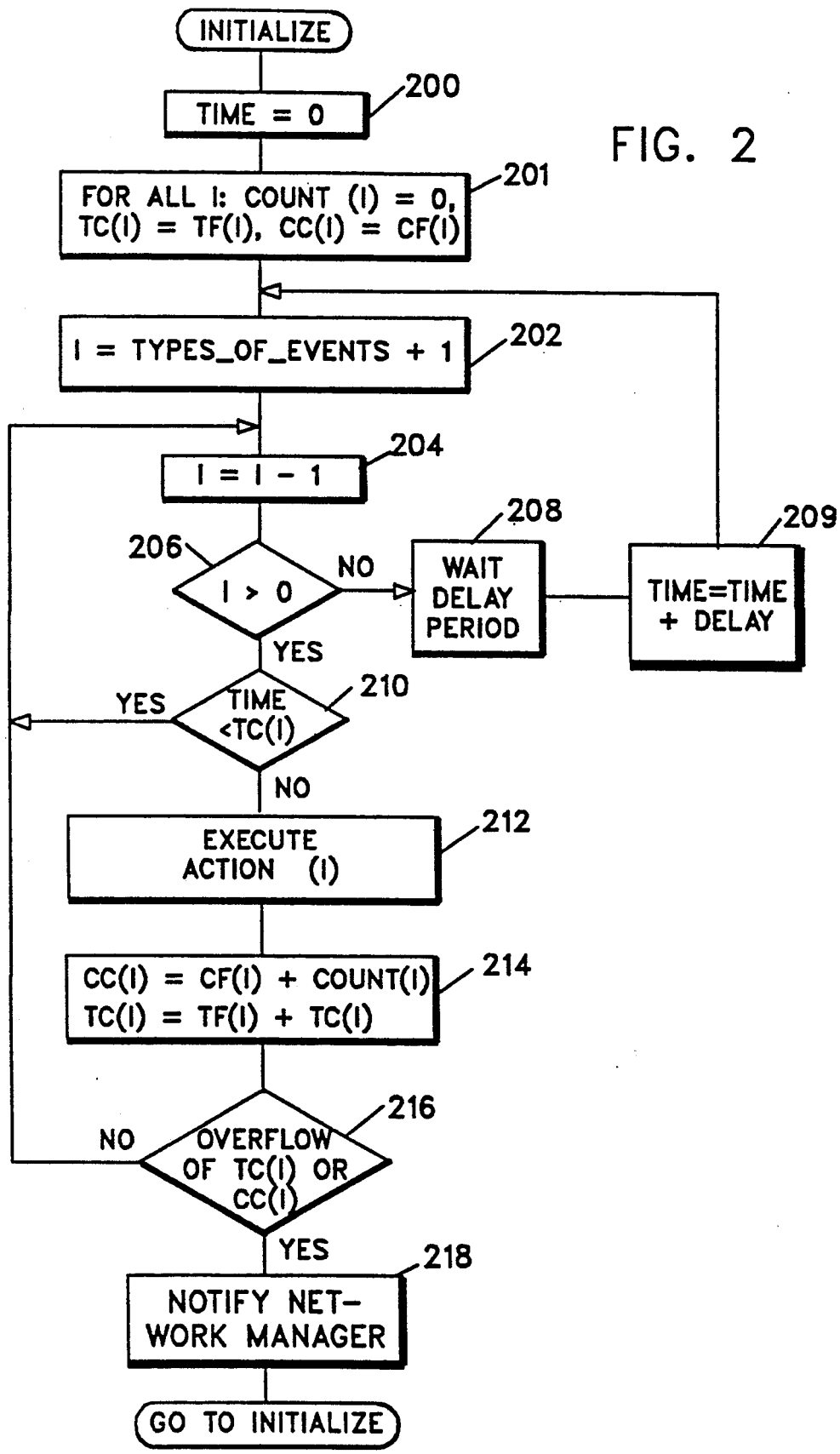
FIG. 2 shows illustrative steps executed in each communication adapters in the preferred embodiment for periodically administering event counters and interval counters by sliding both types of counters along by offsets, thereby allowing the accumulation of both relative and absolute values during a connection.

FIG. 1 shows an illustrative system environment in which the invention might be used. The system includes two processing nodes 100-1 and 100-2. Each node has a microprocessor (or other type of data processing element) 102; The data processing element might consist of a desktop computer, such as a PS/2 (Trademark) computer manufactured by International Business Machines, a reduced instruction set computer (RISC), or other general or special purpose type of computer. In any event, a node in this illustrative system includes some means for the element 102 to communicate with other nodes. In this illustrative embodiment, communication adapter cards 104 provide the communication interface between data processing element 102 of a node and other nodes via connections such as 108. In addition, the nodes communicate with a network management system or application 106 located somewhere in the network.

The purpose of the network manager 106 is to collect event information about the various connections 108 in the network from the individual nodes and to use the information in any desired manner for the purpose of controlling and maintaining the network. For example, a typical use is to detect excessive and intolerable data error rates on a communication link and to alert administrators or remove access to such link from a network automatically. Toward this end, the method to be described for collecting event information at each of the nodes includes a mechanism for communicating information to the network manager 106. Typically, each node collects event information pertinent to its end of a connection. For example, each node may receive information from the other node. It is typically a node's responsibility to collect error statistics regarding the information it receives and to communicate the error statistics to the network manager 106.

Figure 3:
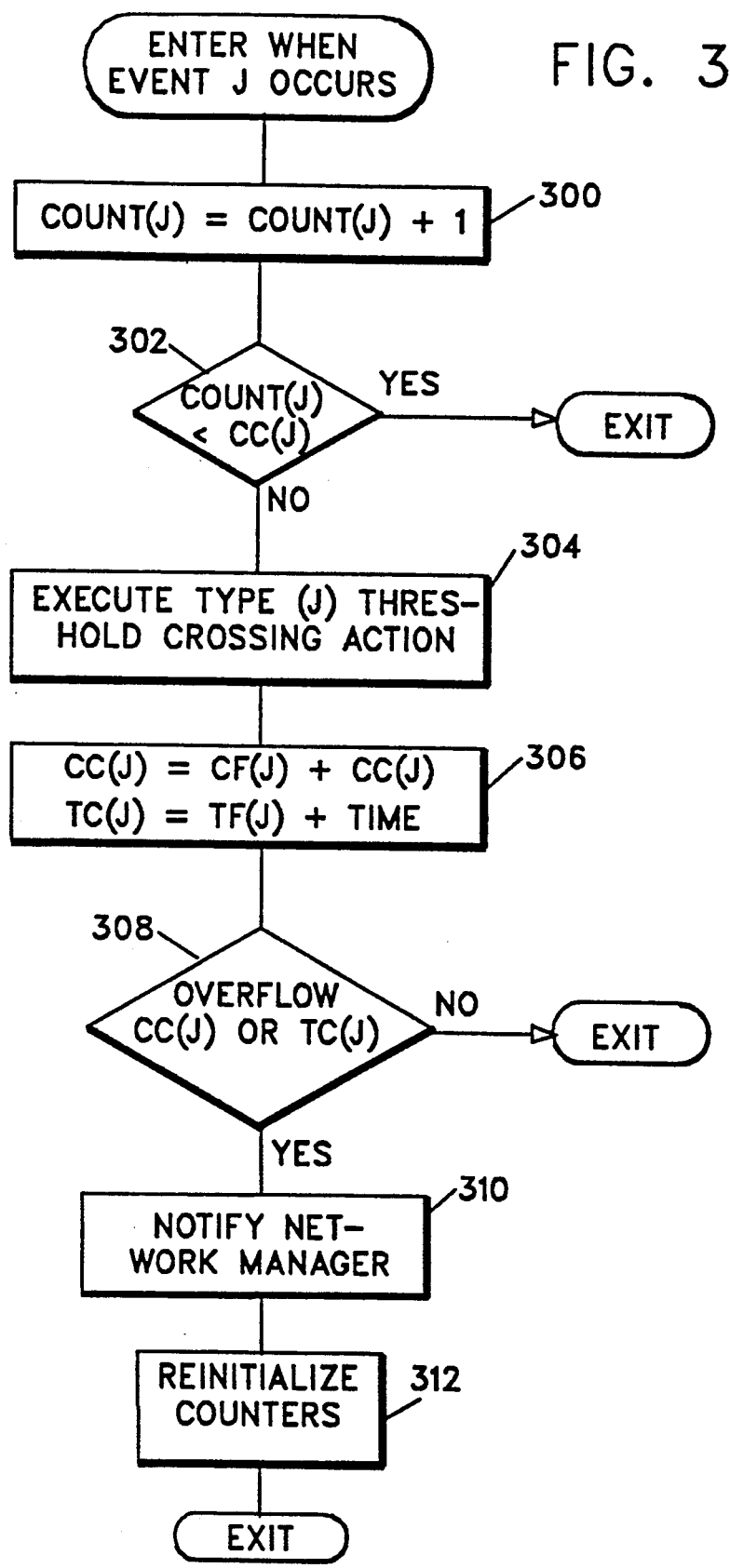
FIG. 3 shows illustrative steps that are executed by a communications adapter in the preferred embodiment upon the occurrence of an event to be measured.

The illustrative embodiment of the method shown in FIGS. 2 and 3 uses a number of variables to perform its functions. These variables are:

TYPES_OF_EVENTS = the number of different types of events to be monitored;

COUNT(I) = the number of times events of type I have occurred since a connection in question was established;

CC(I) = a threshold event comparison value for this event type I;

CF(I) = a predetermined offset value that is added to the contents of COUNT(I) to get the next threshold event comparison value;

TIME = a counter that counts the number of units of time of granularity DELAY (seconds, minutes, etc.) that have passed since the connection was established;

TC(I) the present time threshold comparison value for this type of event; this variable sets the periodic intervals for each event type;

TF(I) = the offset added to the contents of TIME to get the next time threshold comparison value for TC(I); in the illustrative embodiment, this offset is predetermined for each I;

TS(I) = a switch that indicates whether or not the network manager 106 should be notified when this event's present measurement interval expires, i.e., when TIME reaches the present value contained in TC(I);

ACTION(I) = A preestablished table that contains instructions as to what type of action to perform at the expiration of each timing interval and at each event threshold crossing for each event type I.

FIGS. 2 and 3 show illustrative flowcharts of the steps that are performed in the communication adapters 104 of a system to carry out the invention. When a connection line 108 is first established in the system, the steps of FIG. 2 are executed beginning at the program entry point INITIALIZE to begin event collection for the connection. Step 200 initializes TIME to zero to mark the beginning of the connection. Step 201 performs other necessary initialization functions. For each such type of event I, step 201 initializes variables COUNT, TC and CC to beginning states. Specifically, for each I, COUNT is set to zero, TC is set equal to the interval offset TF and CC is set equal to CF. This means that the contents of TC that determines the end of the first measuring interval is set equal to the predetermined offset in TF; the present event threshold is set equal to the offset value in CF.

Step 202 initializes a loop based on the value of I. The remaining steps of FIG. 2, executed as part of the loop, determine when the present timing interval for each type of event expires and "slides" both the interval threshold TC and the event threshold CC forward by their respective offsets to establish a new interval and event threshold. These actions allow absolute values of interval and event counts to be maintained, while at the same time allowing differential values to be used for present measuring purposes. Specifically, step 204 decrements I to establish the next event type for which the present interval is checked. Step 206 determines if all event types have been processed for the present loop. If all event types have been processed, step 208 introduces a prescribed amount of delay in loop processing following which step 209 increments TIME by the DELAY amount; control then returns to step 202 to process the loop again.

For each event type in the processing of one pass through the loop, step 210 determines if the value in TIME is less than the value in TC. If it is, the present timing interval for event I has not yet expired. In this case, FIG. 2 merely proceeds to the next event type at step 204. If the timing interval has expired for this event type I, step 212 determines from ACTION (I) what action should be performed and schedules the action. For example, the action may be to do nothing, or it may be to send a message to the network manager 106 containing information also described by ACTION(I) so that it may track the intervals. Next, step 214 performs the "sliding" operations described above to establish parameters for the next interval. CC is set to CF plus COUNT. This slides the event threshold count forward by an appropriate amount to allow a comparison of COUNT and CC on the occurrence of an event to detect an event threshold crossing during the next interval. The total absolute event count is still maintained in COUNT. TC is incremented by the value of its offset TF to establish the absolute time value for ending the next interval.

The counters TC and CC can overflow, since they are finite in size. Step 216 determines if an overflow occurred in either counter; step 218 notifies the network manager 106 of an overflow. This allows the network manager to be prepared for a shift in numbers on the next event message that may be received for this connection. Control then proceeds to INITIALIZE at the beginning of FIG. 2 to restart the counters. Otherwise, the loop beginning at step 204 is repeated for the next event type.

The steps of FIG. 3 are executed each time an event of type J occurs on the connection in question (U is a particular instance of the event types I). Step 300 immediately increments COUNT for the event type. Step 302 tests the new value of COUNT against the present threshold contained in CC. If the threshold is not reached, i.e., COUNT is less than CC, the routine of FIG. 3 exits to await the next event occurrence. On the other hand, if the threshold is reached, the ACTION table is indexed by J to determine the type of action to be performed when the threshold is exceeded. Typically, this might be the generation of a message containing parameters of interest for this type of event and the transmission of the message via microprocessor 102 to the network manager 106. A simple example of such parameters might be the event type J, the total number of such events since connection from COUNT, the time since the connection was established and the number of events J that have occurred during the present interval. On the other hand, depending on other information sent to the microprocessor, say at the expiration of each interval (FIG. 2), the microprocessor may be programmed to calculate some of the illustrative parameters just mentioned, and others. The particular details of parameter generation, etc. are not relevant to or part of the invention being described.

Following step 304, step 306 updates the CC and TC variables for the event type J. A new interval of time is begun by setting TC t the sum of TIME and the interval offset TF. The new event threshold in CC is set to the present contents of CC plus the event offset CF. Step 308 tests for an overflow of either CC(J) or TC(J). If there is no overflow, the program exits. Otherwise, step 310 notifies the network manager 106 of the overflow so that it adjust itself accordingly; step 312 then reinitializes the counters in the same way that step 201 does before the program exits.

FIG. 4 shows one example of how the contents of variables and intervals vary in relation to an assumed set of event J occurrences. It is assumed for illustration and for event type J that the intervals are measured in seconds, that the interval offset in TF is set to 60 seconds and that the event threshold offset CF is set to 5. At the beginning of the interval identified s 400, it is assumed that the total event count CC is 0, i.e., no events J have yet occurred on the connection. Therefore, COUNT equals 0 at 400 and the threshold count CC equals 5 (from step 214). It is further assumed that the connection has been in existence for 3 minutes at 400. The effects of the contents of DELAY are ignored for this example, since it doesn't materially affect the principles of operation that are being illustrated. Therefore, TC is set to TIME+TF=180+60=240 seconds at the beginning of 400. During interval 400, two events J occur as shown at 406. COUNT becomes equal to 2 as a result of these events (step 300). However, the interval threshold of 5 is not exceeded (step 302) because COUNT (2) is less than CC (5). At the beginning of the next interval 402, COUNT still equals 2 (the total number of events J that have occurred). CC is set to 7 (step 214), the contents of COUNT plus the event offset, 5. TC becomes 300, its earlier value (240) plus the interval offset 60 seconds. During interval 402, 1 more event J occurs at 408. COUNT becomes 3. The threshold in CC (now 7) is still not exceeded. At the beginning of interval 404, COUNT equals 3, CC is updated to 8 (COUNT plus CF) and TC becomes 360 seconds. During interval 404, 5 events J are assumed to occur. On the fifth event at 410, COUNT becomes equal to 8. This equals the present sliding event threshold in CC. Therefore, step 302 triggers a threshold crossing. Step 304 then takes the appropriate action to notify the network manager 106 of the appropriate information as described by ACTION. Step 306 updates CC and TC to begin a new interval in this preferred embodiment.

It is to be understood that the above described arrangements are merely illustrative of the application of principles of the invention and that other arrangements may be devised by workers skilled in the art without departing form the spirit and scope of the invention.

I claim:

1. A method of detecting event thresholds, comprising the steps of
    measuring successive intervals of time,
    maintaining an indication of the total number of events that have occurred,
    establishing an event threshold comparison value at the beginning of each interval relative to the total number of events that have occurred up to that point, and
    in response to a prescribed stimulus, comparing the indication of the total number of events that have occurred to the event comparison threshold value to determine if the threshold has been reached during the interval.

2. The method of claim 1 wherein the step of measuring successive intervals of time further comprises
    incrementing the contents of an interval timer by a prescribed amount at the expiration of each interval defined by the timer to define the expiration time of the next interval defined by the timer relative to real time.

3. The method of claim 2 wherein the step of maintaining an indication of the total number of events further comprises incrementing an event counter in response to each occurrence of an event.

4. The method of claim 3 wherein the prescribed stimulus is the occurrence of an event.

5. The method of claim 4 wherein the step of establishing an event threshold further comprises setting a threshold counter to the sum of the total event count and a predetermined offset value.

6. The method of claim 5 further comprising activating an alert in the event a threshold has been reached during an interval.

7. The method of claim 6 further comprising updating the interval timer and the event threshold comparison value when the event threshold is reached.

8. The method of claim 7 wherein the interval timer further comprises a first counter and the step of establishing an event threshold comparison value for each successive interval further comprises incrementing a second counter.

9. A method of managing event counters, comprising the steps of incrementing the contents of an interval timer by a prescribed amount at the expiration of each interval defined by the timer to define the expiration time of the next interval defined by the timer relative to real time, establishing an event threshold comparison value at the beginning of each interval relative to the total number of events that have already occurred, incrementing an event counter in response to the occurrence of an event, and comparing the event counter to the event comparison threshold value to determine if the threshold has been reached during a present interval.

10. A method of managing event counters, comprising the steps of initializing an event counter, a sliding event threshold counter and a sliding interval counter to prescribed initial states at the start of counter management, at the expiration of an interval specified by the contents of the sliding interval counter, a) incrementing the sliding interval counter by an offset time value, and b) updating the sliding event threshold counter by the sum of an offset event value and the event counter, incrementing the event counter on each occurrence of an event to be counted, and each time the event counter exceeds a threshold established by the sliding threshold event counter, c) incrementing the sliding threshold event counter by the contents of the offset event value, and d) updating the sliding interval counter to the sum of the offset time value and the present time.

11. In a communications network comprising a network management application program, a plurality of data processing nodes, each node further comprising at least one communications adapter interfacing the node to a connection to another node of the network, a method of detecting event thresholds, comprising the steps executed by the communications adapter of measuring successive intervals of time, maintaining an indication of the total number of events of a prescribed type that have occurred on the connection, establishing an event threshold comparison value at the beginning of each interval relative to the total number of events that have occurred up to that point, in response to a prescribed stimulus, comparing the indication of the total number of events that have occurred to the event comparison threshold value to determine if the threshold has been reached during the interval, and transmitting the event information to the network management application program.

12. Apparatus for detecting event thresholds, comprising means for measuring successive intervals of time, means for maintaining an indication of the total number of events that have occurred, means for establishing an event threshold comparison value at the beginning of each interval relative to the total number of events that have occurred up to that point, and means responsive to a prescribed stimulus for comparing the indication of the total number of events that have occurred in the maintaining means to the event comparison threshold value in the establishing means to determine if the threshold has been reached during the interval.

13. The apparatus of claim 12 wherein the measuring means further comprises an interval timer, means for incrementing the contents of the interval timer by a prescribed amount at the expiration of each interval defined by the timer to define the expiration time of the next interval defined by the timer relative to real time.

14. The apparatus of claim 13 wherein the maintaining means further comprises an event counter, means for incrementing the event counter in response to each occurrence of an event.

15. The apparatus of claim 14 wherein the prescribed stimulus is the occurrence of an event.

16. The apparatus of claim 15 wherein the establishing means further comprises a threshold counter, means for setting the threshold counter to the sum of the event counter and a predetermined offset value.

17. The apparatus of claim 16 further comprising means responsive to the comparing means for activating an alert in the event a threshold has been reached during an interval.

18. The apparatus of claim 17 further comprising means for controlling the interval timer to begin a new interval and means for updating the event threshold comparison value when the event threshold is reached.

19. The apparatus of claim 18 wherein the interval timer further comprises a first counter and the establishing means further comprises means for incrementing a second counter.

20. A apparatus for managing event counters, comprising:

means for incrementing the contents of an interval timer by a prescribed amount at the expiration of each interval defined by the timer to define the expiration time of the next interval defined by the timer relative to real time, means for establishing an event threshold comparison value at the beginning of each interval relative to the total number of events that have already occurred, means for incrementing an event counter in response to the occurrence of an event, and means for comparing the event counter to the event comparison threshold value to determine if the threshold has been reached during a present interval.

21. A apparatus for managing event counters, comprising means for initializing an event counter, a sliding event threshold counter and a sliding interval counter to prescribed initial states at the start of counter management, means activated at the expiration of an interval specified by the contents of the sliding interval counter for,
 a) incrementing the sliding interval counter by an offset time value, and
 b) updating the sliding event threshold counter by the sum of an offset event value and the event counter, means for incrementing the event counter on each occurrence of an event to be counted, and means activated each time the event counter exceeds a threshold established by the sliding threshold event counter for
 c) incrementing the sliding threshold event counter by the contents of the offset event value, and
 d) updating the sliding interval counter to the sum of the offset time value and the present time.

22. For use in a communications network comprising a network management application program, a plurality of data processing nodes, each node further comprising at least one communications adapter interfacing the node to a connection to another node of the network and containing apparatus for detecting event thresholds, said apparatus further comprising means for measuring successive intervals of time, means for maintaining an indication of the total number of events of a prescribed type that have occurred on the connection, means for establishing an event threshold comparison value at the beginning of each interval relative to the total number of events that have occurred up to that point, means responsive to a prescribed stimulus for comparing the indication of the total number of events that have occurred to the event comparison threshold value to determine if the threshold has been reached during the interval, and means for transmitting the event information to the network management applications program.

* * * * *